(12) United States Patent
Geise

(10) Patent No.: US 9,705,162 B2
(45) Date of Patent: Jul. 11, 2017

(54) TEMPERATURE CONTROL PLATE FOR A LITHIUM ION BATTERY

(71) Applicant: Robert Bosch GmbH, Stuttgart (DE)

(72) Inventor: Stephan Geise, Ruethen (DE)

(73) Assignee: Robert Bosch GmbH, Stuttgart (DE)

( * ) Notice: Subject to any disclaimer, the term of this patent is extended or adjusted under 35 U.S.C. 154(b) by 193 days.

(21) Appl. No.: 14/196,182

(22) Filed: Mar. 4, 2014

(65) Prior Publication Data

US 2014/0255749 A1 Sep. 11, 2014

(30) Foreign Application Priority Data

Mar. 8, 2013 (DE) .................. 10 2013 203 966

(51) Int. Cl.
| | | |
|---|---|---|
| *H01M 10/651* | (2014.01) | |
| *H01M 10/653* | (2014.01) | |
| *H01M 10/625* | (2014.01) | |
| *H01M 10/6554* | (2014.01) | |
| *H01M 10/6551* | (2014.01) | |
| *H01M 10/613* | (2014.01) | |
| *C08J 5/24* | (2006.01) | |

(52) U.S. Cl.
CPC ............ *H01M 10/5053* (2013.01); *C08J 5/24* (2013.01); *H01M 10/613* (2015.04); *H01M 10/653* (2015.04); *H01M 10/6551* (2015.04); *H01M 10/6554* (2015.04); *C08J 2363/00* (2013.01); *H01M 10/625* (2015.04); *H01M 2220/20* (2013.01)

(58) Field of Classification Search
CPC ......... H01M 10/65551; H01M 10/613; H01M 10/6554; H01M 10/653; H01M 10/625
See application file for complete search history.

(56) References Cited

U.S. PATENT DOCUMENTS

| | | | | |
|---|---|---|---|---|
| 2004/0058249 A1* | 3/2004 | Cai | ..................... | H01M 8/0221 429/248 |
| 2004/0191542 A1* | 9/2004 | McLeod | ............. | B60R 13/0869 428/461 |
| 2007/0037053 A1* | 2/2007 | Anantharaman | ....... | H01M 2/02 429/176 |
| 2012/0103714 A1* | 5/2012 | Choi | ........................ | B60K 1/04 180/68.5 |
| 2013/0137322 A1* | 5/2013 | Watanabe | ........... | H01L 23/3733 442/38 |
| 2013/0273829 A1* | 10/2013 | Obasih | .............. | H01M 10/5004 454/284 |
| 2013/0344362 A1* | 12/2013 | Raisch | ..................... | F28D 1/00 429/93 |

FOREIGN PATENT DOCUMENTS

| | | | | |
|---|---|---|---|---|
| DE | 10 2011 002 415 A1 | 7/2012 | | |
| WO | WO2012029560 | * | 3/2012 | ............. B32B 27/12 |

* cited by examiner

*Primary Examiner* — Rena D Cronin
(74) *Attorney, Agent, or Firm* — Maginot, Moore & Beck LLP

(57) ABSTRACT

A temperature control plate for controlling the temperature of components. The temperature control plate is formed of a plastic-metal composite material which includes a metal fiber fabric that is surrounded by a thermoset plastic. A casing contains the components. The temperature control plate is configured for conducting heat away from temperature-exposed components.

16 Claims, 1 Drawing Sheet

TEMPERATURE CONTROL PLATE FOR A LITHIUM ION BATTERY

This application claims priority under 35 U.S.C. §119 to patent application no. DE 10 2013 203 966.2, filed on Mar. 8, 2013 in Germany, the disclosure of which is incorporated herein by reference in its entirety.

The present disclosure relates to a temperature control plate and to a casing, more particularly for a lithium ion battery, and also to a corresponding battery arrangement.

BACKGROUND

Lithium ion cells for battery systems conventionally have a metallic shell, made of aluminum, for example. A plurality, for example six to eight, of these cells are customarily assembled to form a battery module, and in turn a plurality, for example three or more, of these battery modules may be assembled to form a battery pack. For the purpose of temperature control, the battery modules or battery packs are usually mounted on a metallic cooling plate. The cooling plate may be machined beforehand to the installed dimensions. A cooling medium is conducted customarily over the area beneath the cooling plate. In order to avoid a short circuit between the cells and the metallic cooling plate, an electrical insulator is positioned between the cells and the metallic plate.

The document DE 10 2011 002 415 A1 discloses, for example, a temperature control plate for controlling the temperature of lithium ion cells. This temperature control plate can be produced by injection-molding a plastic around a metallic conduction element. Injection-molding processes, however, impose exacting requirements on the fluidity and also the thermal and dimensional integrity of a thermoplastic.

SUMMARY

The present disclosure provides a temperature control plate for controlling the temperature of components, more particularly of one or more battery cells—for example, lithium ion cells.

In accordance with the disclosure, the temperature control plate is formed of a plastic-metal composite material which comprises a metal fiber fabric that is surrounded by a thermoset plastic.

A thermoset plastic may, for the purposes of the present disclosure, more particularly be a plastic which is no longer deformable after curing.

A metal fiber fabric may, for the purposes of the present disclosure, be a fabric formed of metal fibers. A fabric may comprise metal fibers more particularly in the form of individual strands, multifilament bundles or multifilament yarns, or as non-woven fabrics or sheets. The length of the fibers may vary between very short and continuous. It is possible, more particularly, to use a metal fiber fabric in the form of a continuous sheet for producing a plastic-metal composite material.

It is possible by means of the above-described temperature control plate, and using a crosslinking thermoset in conjunction with a reinforcing metal fiber fabric in the interior of the plate, to provide a temperature control plate that possesses great thermal and dimensional integrity. Furthermore, a thermoset plastic is able to surround the metal fiber fabric positively.

The metal fiber fabric may more particularly be a conductive fabric. by virtue of the fact that the conductive metal fiber fabric is surrounded by an electrically insulating thermoset plastic, the resin layer on the surface is able, advantageously, to ensure electrical insulation.

An above-described temperature control plate may advantageously and more particularly be a cooling plate. Battery cells, for example, may be installed together on such cooling plates. A cooling plate of this kind is able outstandingly to dissipate the heat from battery cells, for example. Moreover, thermoset plastics are resistant to cooling media that are customarily used. This has the advantage, furthermore, that the metal fabric is not attacked. Accordingly, the above-described temperature control plate, more particularly cooling plate, can be used to very good effect to conduct heat away from temperature-exposed components such as battery cells, more particularly lithium ion cells, or else control instrument casings.

Moreover, particularly as compared with conventional metallic cooling plates, a plastic-metal composite material comprising a metal fiber fabric that is surrounded by a thermoset plastic can be produced, advantageously, more easily and more inexpensively.

In one embodiment, the thermoset plastic may be formed of an epoxy resin.

An epoxy resin for the purposes of the present disclosure may be a reactive resin formed from a reaction of epoxides with polyhydric alcohols, such as from a reaction of epichlorohydrin with bisphenol A, for example. Advantageously, noncrosslinked epoxy resins are of low viscosity. As a result, during the processing time, the highly fluid resin material is able effectively to enclose the fibers of the metal fiber fabric. Curing turns a noncrosslinked epoxy resin into a solid, crosslinked, thermoset material. A plastic-metal composite material which comprises a metal fiber fabric that is surrounded by a thermoset plastic may be produced, in particular, by a compression molding process. A low-pressure epoxy compression compound is particularly suitable for this purpose.

In one embodiment, the thermoset plastic may have at least one additive for increasing the thermal conductivity. An additive for increasing the thermal conductivity may be understood, in the sense of the present disclosure, more particularly as an additive which increases the specific thermal conductivity of the plastic, relative to the specific thermal conductivity of the plastic without the additive. The additive for increasing the thermal conductivity may be selected from the group encompassing aluminum oxide, aluminum hydroxide, boron nitride, magnesium hydroxide, or a combination thereof. The additive for increasing the thermal conductivity may more particularly be aluminum oxide.

In one embodiment, the plastic may have in the range from 80 wt % to 91 wt %, based on the total weight of the plastics material, of an additive for increasing the thermal conductivity. In a further embodiment, the plastic may have in the range from 85 wt % to 91 wt %, based on the total weight of the plastics material, of an additive for increasing the thermal conductivity. In contrast, for example, to a thermoplastic resin, a thermoset resin may be produced with a very high level of fillers. Hence the thermoset plastic may contain up to 91 wt % of an additive, and by this means, especially together with a metal fiber fabric, the thermal conductivity of a temperature control plate is significantly increased.

In one embodiment, the metal fibers may be formed of aluminum or copper. Aluminum fibers and copper fibers may exhibit very good conductivity. Furthermore, fabrics composed of aluminum or copper provide an opportunity to produce temperature control plates with more beneficial materials costs than more expensive metals. Accordingly, an inexpensive temperature control plate or cooling plate can be obtained. Metal fiber fabrics composed of aluminum fibers or copper fibers may be produced on a continuous sheet, in a weaving mill, for example.

For improving the temperature control, the temperature control plate may comprise temperature control structures, such as one or more temperature control fins for dissipating heat, to a temperature control medium or coolant medium, for example. The temperature control medium may in principle be a liquid, gaseous, or solid temperature control medium. In the case of battery arrangements, a temperature control medium in liquid form is customarily conducted over the area beneath a cooling plate.

In one embodiment, the temperature control plate may have fins on the side remote from the component. The side of a temperature control plate that is remote from a component disposed on a temperature control plate is also referred to as the underside. The fins, or cooling fins, may project into the cooling medium, and so the cooling medium is able to dissipate the heat very effectively. More particularly, by virtue of effective fluidity, a low-viscosity epoxy resin may mean that such cooling fins can be molded without cavity defects.

In one embodiment, the plastic-metal composite material may be produced by means of a compression molding process. More particularly, the plastic-metal composite material may be produced by compression molding of a continuous sheet of a metal fiber fabric with an epoxy resin.

A compression molding process for the purposes of the present disclosure may be a process which includes the shaping of a plastic compound by the action of pressure in a mold. In the case of thermoset molding compounds, hot compression molding, relative, for example, to injection molding, may be employed advantageously if parts are being surround-compression-molded using a molding compound. Furthermore, compression molding is usually less costly than injection molding machines, thereby reducing the unit costs.

A great advantage of producing a temperature control plate by means of a compression molding process is that the top face, or surface later facing a component, can be manufactured with high planarity and without distortion. A very planar surface without distortion may ensure effective contact with a component applied thereon, as for example with a lithium ion cell, which customarily have a metallic shell.

Metal fiber fabrics composed of aluminum fibers or copper fibers can be produced on a continuous sheet. A continuous sheet of this kind may be drawn through a suitable compression molding tool, a molding press for example, and when the molding tool is closed, the continuous sheet is separated off at the diecut edge in each case. The molding tool may be conditioned to a temperature suitable for the thermoset resin used. A thermoset resin, such as a low-pressure epoxy compression molding compound, for example, may be introduced into a molding tool, which is conditioned, for example, to a temperature of 180° C., and compression-molded with the metal fiber fabric. Compression molding may take place, for example, at a pressure of 20 bar. In the molding tool, the resin is able to crosslink around the metal fiber fabric and form a highly dimensionally and thermally stable plastic-metal composite material. After the resin has crosslinked, the composite material may be removed. As a result of the compression molding process, one side of the composite material can have a very planar surface without distortion, while cooling fins may be molded on the other surface. In a further process step, optionally, the composite material may undergo aftercrosslinking, at a temperature of 120° C., for example, more particularly in a conditioning oven. By this means it is possible further to increase the degree of crosslinking of the resin. Production processes of these kinds are known for the production of circuit board material, and permit cost-effective production.

With regard to further advantages and features of the temperature control plate of the disclosure, explicit reference is hereby made to the explanations in connection with the casing of the disclosure, the battery arrangement of the disclosure, the use according to the disclosure, the figures, and the description of the figures.

The present disclosure further provides a casing, more particularly a plastics casing, for a component, comprising a temperature control plate of the disclosure. The component may be one or more battery cells, more particularly one or more lithium ion cells. The component may more particularly be a component from the automobile segment—apart from a battery module, for example, also a control instrument casing. These components are frequently subject to severe temperature loads. The temperature control plate may therefore more particularly be a cooling plate suitable for conducting heat away from a component. Casings for temperature-exposed components benefit significantly from effective heat removal by conduction.

Particularly, if the component is a control instrument, the temperature control plate may be formed advantageously as a casing cover. A cover in the context of the present disclosure may be understood, more particularly, as a casing component which is designed to seal off one or more casing components to form a closed casing. The term "cover" is not to be understood restrictively here with regard to the orientation of the casing component identified as cover in terms of gravitational direction. Accordingly, a cover may be understood to be a casing component which is designed to seal off at the top, or else at the side or bottom, one or more casing components, to form a closed casing. The temperature control plate of the disclosure may be formed more particularly as a cover in plate form of a plastics casing for a control instrument. With control instruments, the internal heat is frequently conducted away via a cover.

Casings, more particularly plastics casings, for battery cells customarily comprise temperature control plates, more particularly cooling plates, beneath the battery modules or battery packs. These battery modules or packs are frequently mounted on the cooling plate, and a cooling medium is conducted beneath the cooling plate. For example, the cooling plate may be inserted into a plastics casing and affixed by means of mechanical methods such as screws or clips. More particularly, the temperature control plate or cooling plate may be inserted into a plastics casing by means of a snap connection.

The present disclosure further provides a battery arrangement, more particularly a battery or a battery module, comprising a temperature control plate of the disclosure and/or a casing of the disclosure and one or more battery cells, more particularly lithium ion cells.

A battery is understood in the sense of the present disclosure to comprehend not only primary storage devices, but also, in particular, accumulators (secondary storage devices). Accumulators are frequently likewise referred to using the term battery, which is widely used as a generic term.

The battery arrangement may more particularly be a battery module comprising multiple, for example six to eight, battery cells which are assembled to form a battery module. The battery arrangement may also be a battery pack, in which multiple, for example three or more, battery modules may be assembled to form a battery pack. The battery, the battery module, or the battery pack may be mounted on the temperature control plate.

With regard to further advantages and features of the battery arrangement of the disclosure, explicit reference is hereby made to the explanations in connection with the temperature control plate of the disclosure, the casing of the disclosure, and the description of the figures.

The present disclosure further provides for the use of a temperature control plate of the disclosure for conducting heat away particularly from temperature-exposed components, more particularly from the automobile segment such as battery modules or control instrument casings. In this context, the temperature control plate may find use, more particularly, as a cooling plate. Temperature-exposed components may more particularly be battery modules or control instrument casings. With these components, conduction of heat via a stable plate is particularly advantageous.

With regard to further technical features and advantages of the use according to the disclosure, explicit reference is hereby made to the explanations in connection with the temperature control plate of the disclosure, the casing of the disclosure, the figures, and also the description of the figures.

Further advantages and advantageous embodiments of the subject matter of the disclosure are illustrated by the drawings and elucidated in the description which follows. It should be borne in mind here that the examples and drawings are only descriptive in nature and are not intended to restrict the disclosure in any form whatsoever. In the drawings

DETAILED DESCRIPTION

Figure 1:
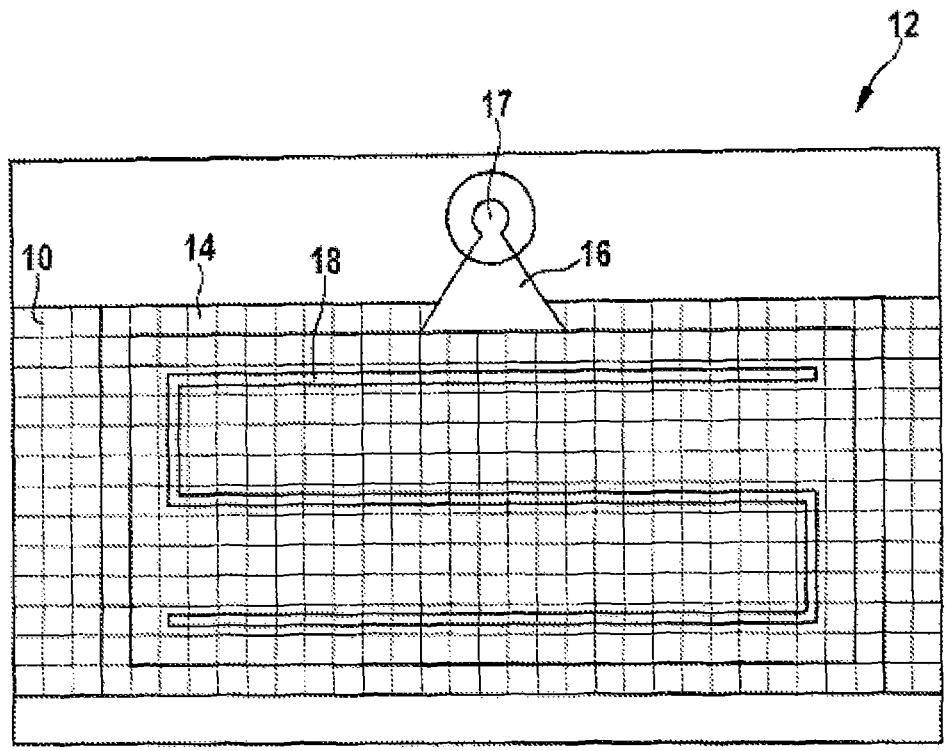
FIG. 1 shows a schematic front elevation of a molding tool with a continuous metal fabric sheet.

FIG. 1 illustrates schematically the production of a cooling plate by a hot compression molding process by the shaping of a thermoset compound under the action of pressure in a molding tool.

A continuous sheet of a metal fiber fabric 10, made of aluminum fibers, for example, is drawn through a molding tool 12. The closing of the molding tool 12 separates off the continuous sheet 10 at a diecut edge 14. The molding tool 12 may be conditioned to a temperature suitable for the thermoset resin used, such as to 180° C., for example. A thermoset resin 16, as for example a low-pressure epoxy compression molding compound, which may comprise aluminum oxide for increasing the thermal conductivity, is introduced through a die 17 into the conditioned molding tool 12. Compression molding of the epoxy resin 16 with the metal fiber fabric 10 may take place at a pressure of 20 bar, for example. As a result of the compression molding in the molding tool 12, the resin 16 is crosslinked around the metal fiber fabric 10. In the course of this process, cooling fins 18 may be molded on the subsequent underside. After the resin has crosslinked, the composite material may be removed from the molding tool 12. The compression molding process allows the formation of a very dimensionally and thermally stable plastic-metal composite material.

Figure 2:
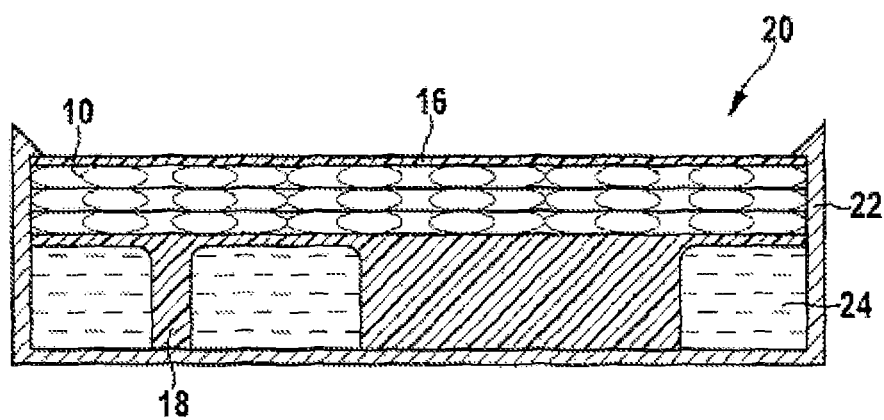
FIG. 2 shows a schematic cross section through one embodiment of a cooling plate of the disclosure.

FIG. 2 shows an embodiment of a cooling plate 20 for controlling the temperature of components. The cooling plate 20 is formed of a plastic-metal composite material which comprises a metal fiber fabric 10, made of aluminum, for example, that is surrounded by a thermoset plastic 16. The thermoset plastic, based on the total weight of the plastics material, may have 91 wt % of aluminum oxide for the purpose of increasing the thermal conductivity. The cooling plate 20 is inserted, by means of a snap connection, for example, as baseplate into a plastics casing 22 for a component. On the underside, remote from the component, the cooling plate 20 has fins 18, and a cooling medium 24 is realized over the area beneath the fins. A component which is to be cooled, such as a battery or a battery module, for example, may be mounted to the top face of the cooling plate 20, which can be formed very planarly and without distortion.

What is claimed is:

1. A battery arrangement, comprising:
one or more battery cells;
a temperature control plate, wherein:
the temperature control plate is configured to control a temperature of the battery cells by conducting heat away from the one or more battery cells; and
the temperature control plate comprises a plastic-metal composite material which includes a metal fiber fabric that is surrounded by a thermoset plastic, said plate including a side in direct physical and heat transfer contact with the one or more battery cells; and
a casing, wherein the temperature control plate is inserted into the casing to maintain the temperature control plate in direct heat transfer contact with the one or more battery cells,
wherein the temperature control plate includes fins on a side remote from the side in physical and heat transfer contact with the one or more battery cells, the fins together with the casing defining a number of cavities between the temperature control plate and the casing, the cavities including a cooling medium therein.

2. The battery arrangement according to claim 1, wherein the thermoset plastic includes an epoxy resin.

3. The battery arrangement according to claim 2, wherein the thermoset plastic comprises at least one additive configured to increase a thermal conductivity relative to the epoxy resin.

4. The battery arrangement according to claim 2, wherein the thermoset plastic comprises an additive for increasing a thermal conductivity relative to the epoxy resin, the additive provided in a range from ≥80 wt % to ≤91 wt %, based on a total weight of the thermoset plastic.

5. The battery arrangement according to claim 1, wherein the metal fiber fabric comprises aluminum or copper.

6. The battery arrangement according to claim 1, wherein the plastic-metal composite material comprises a compression molding of a continuous sheet of the metal fiber fabric with an epoxy resin.

7. The battery arrangement according to claim 1, wherein the casing is configured to receive the temperature control plate in a snap connection.

8. A battery arrangement, comprising:
one or more battery cells;
a temperature control plate, wherein:

the temperature control plate is configured to control a temperature of the battery cells by conducting heat away from the one or more battery cells; and the temperature control plate comprises a plastic-metal composite material which includes a metal fiber fabric that is surrounded by a thermoset plastic, said plate including a side in direct physical and heat transfer contact with the one or more battery cells; and a casing, wherein the temperature control plate is inserted into the casing to maintain the temperature control plate in direct heat transfer contact with the one or more battery cells, wherein the battery cells are mounted on and in direct contact with the temperature control plate.

9. The battery arrangement according to claim 8, wherein the thermoset plastic includes an epoxy resin.

10. The battery arrangement according to claim 9, wherein the thermoset plastic comprises at least one additive configured to increase a thermal conductivity relative to the epoxy resin.

11. The battery arrangement according to claim 9, wherein the thermoset plastic comprises an additive for increasing a thermal conductivity relative to the epoxy resin, the additive provided in a range from ≥80 wt % to ≤91 wt %, based on a total weight of the thermoset plastic.

12. The battery arrangement according to claim 8, wherein the metal fiber fabric comprises aluminum or copper.

13. A battery arrangement, comprising:
one or more battery cells;
a temperature control plate, wherein:
the temperature control plate is configured to control a temperature of the battery cells by conducting heat away from the one or more battery cells; and
the temperature control plate comprises a plastic-metal composite material which includes a metal fiber fabric that is surrounded by a thermoset plastic, said plate including a side facing and in direct physical and heat transfer contact with the one or more battery cells;

a casing, wherein the temperature control plate is inserted into the casing to maintain the temperature control plate in direct heat transfer contact with the one or more battery cells; and a cooling medium circulated within said casing below and in heat transfer contact with an opposite side of the temperature control plate facing away from and not in direct physical contact with the one or more battery cells.

14. The battery arrangement according to claim 13, wherein the thermoset plastic includes an epoxy resin.

15. The battery arrangement according to claim 14, wherein the thermoset plastic comprises at least one additive configured to increase a thermal conductivity relative to the epoxy resin.

16. The battery arrangement according to claim 14, wherein the thermoset plastic comprises an additive for increasing a thermal conductivity relative to the epoxy resin, the additive provided in a range from ≥80 wt % to ≤91 wt %, based on a total weight of the thermoset plastic.

* * * * *